United States Patent
Prakash et al.

(10) Patent No.: US 7,386,160 B2
(45) Date of Patent: Jun. 10, 2008

(54) SYSTEM AND METHOD FOR DETERMINING IMAGE RESOLUTION USING MICR CHARACTERS

(75) Inventors: Ravinder Prakash, Concord, NC (US); Rodney G. Moon, Charlotte, NC (US); Madhura A. Sathe, Charlotte, NC (US); Clair F. Rohe, Huntersville, NC (US)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 11/001,931

(22) Filed: Dec. 2, 2004

(65) Prior Publication Data

US 2006/0120587 A1    Jun. 8, 2006

(51) Int. Cl.
*G06K 9/36* (2006.01)
*G06K 7/10* (2006.01)
*G06K 9/20* (2006.01)

(52) U.S. Cl. ............ 382/140; 382/292; 382/296; 382/320; 382/321

(58) Field of Classification Search ........... 382/137, 382/139, 140, 286, 290, 291, 292, 298, 320, 382/321
See application file for complete search history.

(56) References Cited

U.S. PATENT DOCUMENTS

| | | | |
|---|---|---|---|
| 3,710,323 A * | 1/1973 | Andrews et al. ........... 382/293 |
| 4,408,342 A | 10/1983 | Grabowski et al. | |
| 4,817,176 A | 3/1989 | Marshall et al. | |
| 4,932,065 A | 6/1990 | Feldgajer | |
| 5,026,974 A * | 6/1991 | Franklin et al. ........... 235/449 |
| 5,091,968 A | 2/1992 | Higgins et al. | |
| 5,253,303 A * | 10/1993 | Whitesel et al. ........... 382/178 |
| 5,524,063 A | 6/1996 | Henrot | |
| 5,581,633 A * | 12/1996 | Hotta et al. .............. 382/171 |
| 5,613,016 A * | 3/1997 | Saitoh .................... 382/174 |
| 5,729,621 A | 3/1998 | Marshall et al. | |
| 6,922,487 B2 * | 7/2005 | Dance et al. ............. 382/190 |
| 2003/0059099 A1 | 3/2003 | Tateishi | |
| 2006/0045322 A1 * | 3/2006 | Clarke et al. ............. 382/137 |

* cited by examiner

*Primary Examiner*—Brian P. Werner
*Assistant Examiner*—Anthony Mackowey
(74) *Attorney, Agent, or Firm*—Douglas A. Lashmit; Hoffman Warnick LLC

(57) ABSTRACT

A system and method for determining the image resolution of a check image using MICR characters. The disclosed system includes an extracting system for extracting a magnetic ink code recognition (MICR) code line from the document image, wherein the extracting system provides coordinate values for each of a plurality of MICR characters in the MICR code line; a calculating system for calculating a set of resolution values based on the coordinate values of the MICR characters; and a statistical analysis system that calculates a representative resolution value from the set of resolution values.

7 Claims, 5 Drawing Sheets

| comp # | Micr Char | TopLx | TopLy | BottomRx | BottomRy | Diff Rx | Diff Ry |
|---|---|---|---|---|---|---|---|
| 0 | 0 | 105 | 564 | 126 | 593 | | 247.95 |
| 1 | 8 | 134 | 564 | 155 | 592 | 232 | 239.4 |
| 2 | 1 | 174 | 564 | 186 | 593 | 248 | 247.95 |
| 3 | 9 | 198 | 564 | 216 | 593 | 240 | 247.95 |
| 4 | 0 | 224 | 564 | 246 | 593 | 240 | 247.95 |
| 5 | 4 | 257 | 564 | 275 | 593 | 232 | 247.95 |
| 6 | 8 | 284 | 564 | 306 | 593 | 248 | 247.95 |
| 7 | 0 | 315 | 565 | 336 | 593 | 240 | 239.4 |
| 8 | 8 | 344 | 564 | 365 | 594 | 232 | 256.5 |
| 9 | 0 | 434 | 565 | 455 | 594 | 720 | 247.95 |
| 10 | 1 | 472 | 565 | 485 | 595 | 240 | 256.5 |
| 11 | 1 | 503 | 565 | 515 | 594 | 240 | 247.95 |
| 12 | 5 | 530 | 567 | 545 | 595 | 240 | 239.4 |
| 13 | 0 | 554 | 567 | 576 | 595 | 248 | 239.4 |
| 14 | 8 | 583 | 566 | 605 | 596 | 232 | 256.5 |
| 15 | 0 | 614 | 567 | 635 | 595 | 240 | 239.4 |
| 16 | 0 | 643 | 567 | 665 | 596 | 240 | 247.95 |
| 17 | 5 | 679 | 568 | 695 | 597 | 240 | 247.95 |
| 18 | 0 | 704 | 566 | 725 | 596 | 240 | 256.5 |
| 19 | 8 | 762 | 567 | 784 | 596 | 472 | 247.95 |
| 20 | 2 | 861 | 566 | 874 | 595 | 720 | 247.95 |
| 21 | 3 | 889 | 566 | 904 | 595 | 240 | 247.95 |
| 22 | 0 | 912 | 567 | 934 | 596 | 240 | 247.95 |
| 23 | 8 | 942 | 566 | 964 | 596 | 240 | 256.5 |
| 24 | 0 | 1041 | 571 | 1063 | 599 | 792 | 239.4 |
| 25 | 0 | 1101 | 570 | 1122 | 598 | 472 | 239.4 |
| 26 | 0 | 1131 | 571 | 1152 | 599 | 240 | 239.4 |
| 27 | 0 | 1160 | 572 | 1182 | 600 | 240 | 239.4 |
| 28 | 0 | 1190 | 571 | 1211 | 600 | 232 | 247.95 |
| 29 | 5 | 1225 | 571 | 1240 | 600 | 232 | 247.95 |
| 30 | ? | 1251 | 572 | 1269 | 600 | 232 | 239.4 |
| 31 | 5 | 1283 | 572 | 1299 | 601 | 240 | 247.95 |
| 32 | ? | 1310 | 571 | 1329 | 601 | 240 | 256.5 |

FIG. 2

| comp # | Micr Char | TopLx | TopLy | BottomRx | BottomRy | Diff Rx | Diff Ry |
|---|---|---|---|---|---|---|---|
| 0 | 0 | 87 | 468 | 105 | 492 |  | 205.2 |
| 1 | 8 | 112 | 468 | 129 | 491 | 192 | 196.65 |
| 2 | 1 | 145 | 468 | 155 | 492 | 208 | 205.2 |
| 3 | 9 | 165 | 469 | 180 | 492 | 200 | 196.65 |
| 4 | 0 | 187 | 468 | 205 | 492 | 200 | 205.2 |
| 5 | 4 | 215 | 468 | 230 | 492 | 200 | 205.2 |
| 6 | 8 | 237 | 468 | 255 | 492 | 200 | 205.2 |
| 7 | 0 | 262 | 469 | 280 | 492 | 200 | 196.65 |
| 8 | 8 | 287 | 468 | 305 | 493 | 200 | 213.75 |
| 9 | 0 | 362 | 469 | 380 | 493 | 600 | 205.2 |
| 10 | 1 | 394 | 469 | 405 | 494 | 200 | 213.75 |
| 11 | 1 | 420 | 469 | 430 | 493 | 200 | 205.2 |
| 12 | 5 | 442 | 470 | 455 | 494 | 200 | 205.2 |
| 13 | 0 | 462 | 470 | 480 | 494 | 200 | 205.2 |
| 14 | 8 | 487 | 470 | 505 | 495 | 200 | 213.75 |
| 15 | 0 | 512 | 470 | 530 | 494 | 200 | 205.2 |
| 16 | 0 | 537 | 471 | 555 | 495 | 200 | 205.2 |
| 17 | 5 | 567 | 472 | 580 | 495 | 200 | 196.65 |
| 18 | 0 | 587 | 470 | 605 | 495 | 200 | 213.75 |
| 19 | 8 | 636 | 471 | 654 | 495 | 392 | 205.2 |
| 20 | 2 | 719 | 470 | 730 | 494 | 608 | 205.2 |
| 21 | 3 | 742 | 470 | 755 | 494 | 200 | 205.2 |
| 22 | 0 | 762 | 471 | 780 | 495 | 200 | 205.2 |
| 23 | 8 | 787 | 470 | 805 | 495 | 200 | 213.75 |
| 24 | 0 | 869 | 474 | 888 | 497 | 664 | 196.65 |
| 25 | 0 | 919 | 473 | 937 | 497 | 392 | 205.2 |
| 26 | 0 | 944 | 474 | 962 | 497 | 200 | 196.65 |
| 27 | 0 | 968 | 474 | 986 | 498 | 192 | 205.2 |
| 28 | 0 | 993 | 474 | 1011 | 498 | 200 | 205.2 |
| 29 | 5 | 1023 | 474 | 1035 | 498 | 192 | 205.2 |
| 30 | 6 | 1044 | 474 | 1060 | 498 | 200 | 205.2 |
| 31 | 5 | 1071 | 475 | 1085 | 498 | 200 | 196.65 |
| 32 | 6 | 1094 | 474 | 1109 | 499 | 192 | 213.75 |

FIG. 5

SYSTEM AND METHOD FOR DETERMINING IMAGE RESOLUTION USING MICR CHARACTERS

BACKGROUND OF THE INVENTION

1. Technical Field

The present invention relates generally to image processing, and relates more specifically to a system and method for determining image resolution using MICR (magnetic ink code recognition) characters.

2. Related Art

The finance industry has adopted electronic images of checks as a key component of check processing. The recent passage of the Check 21 Act, which allows institutions to process check images, as opposed to the actual paper document, further attests to the progressively increasing use of such images. As such, the ability to efficiently process high volumes of check images is a critical requirement for such institutions.

To enable the use of several image processing technologies, such as OCR (optical character resolution), etc., the imaging resolution of the imaged document is required. In general, image resolution is a measurement of pixels/inch. Occasionally, at the time of capture, the imaging resolution is either not recorded in the image header or is recorded incorrectly. Without the resolution, the document cannot be processed. Thus, it becomes necessary that the imaging resolution be established by some independent means.

To date, no one has addressed this problem. Accordingly, a need exists for a process that can determine the imaging resolution of an imaged document, such as a check.

SUMMARY OF THE INVENTION

The present invention addresses the above-mentioned problems, as well as others by providing a system and method for determining image resolution using the MICR characters printed on the imaged document. In a first aspect, the invention provides a system for determining an image resolution of a document image, comprising: an extracting system for extracting a magnetic ink code recognition (MICR) code line from the document image, wherein the extracting system provides coordinate values for each of a plurality of MICR characters in the MICR code line; a calculating system for calculating a set of resolution values based on the coordinate values of the MICR characters; and a statistical analysis system that calculates a representative resolution value from the set of resolution values.

In a second aspect, the invention provides a program product stored on a computer readable medium for determining an image resolution of a document image, comprising: program code configured for extracting a magnetic ink code recognition (MICR) code line from the document image; program code configured for providing coordinate values for each of a plurality of MICR characters in the MICR code line; program code configured for calculating a set of resolution values based on the coordinate values of the MICR characters; and program code configured for calculating a final resolution value from the set of resolution values.

In a third aspect, the invention provides a computerized method for determining an image resolution of a document image, comprising: extracting a magnetic ink code recognition (MICR) code line from the document image; determining coordinate values for each of a plurality of MICR characters in the MICR code line; calculating a set of resolution values based on the coordinate values of the MICR characters; and calculating a final resolution value from the set of resolution values.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a table displaying coordinate and resolution values of a first image in accordance with present invention.

FIG. 5 depicts a table displaying coordinate and resolution values of a second image in accordance with present invention.

Figure 1:
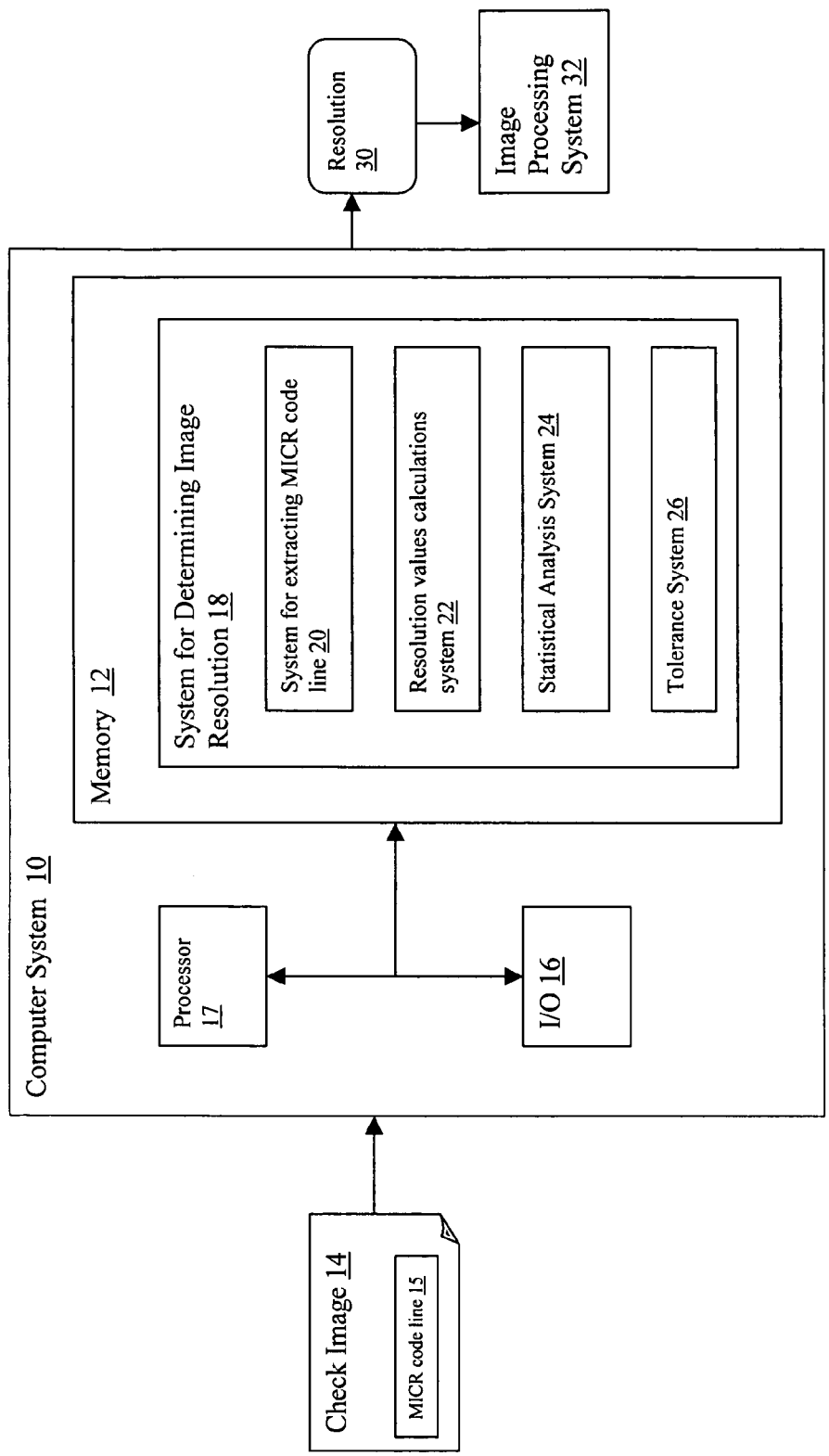
FIG. 1 depicts a diagram of a system for determining image resolution in accordance with present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring now to the drawings, FIG. 1 depicts an illustrative computer system 10 that inputs a check image 14 and outputs a resolution 30 of the check image 14. Check image 14 may comprise a bitonal, e.g., black white, image, or a grayscale image. Computer system 10 generally includes a processor 17, input/output (I/O) 16, and memory 12. Stored in memory 12, e.g., as a program product, is a system 18 for determining image resolution. As described in further detail below, the system 18 for determining image resolution determines the resolution 30 of the check image 14 by examining the MICR (magnetic ink character recognition) code line 15 on the check. Once the resolution 30 is calculated, the information can be fed into an image processing system 32 (e.g., optical character recognition, storage, etc.), where the check image 14 can be further processed.

As is known in the art, a MICR code line 15 complying with the E13B standard is printed on every check. The E13B standard dictates the spacing and height of the characters in the code line. Namely, the standard dictates a right justified spacing between characters of 0.125 inches and a character height of 0.117 inches. Accordingly, by analyzing the corresponding image pixels of the MICR code line 15 in the check image 14, the image resolution (i.e., pixels/inch or dots per inch "dpi") of the check image 14 can be readily calculated in both horizontal (X) and vertical (Y) directions. Note that while the invention is described with reference to determining a resolution of a check image 14 by analyzing the MICR code line 15, the invention could be used to determine a resolution of any imaged document that contains MICR characters or the like that have known spatial characteristics (e.g., E13B).

In the illustrative embodiment of FIG. 1, the system 18 for determining image resolution includes a system 20 for extracting MICR code line data, a resolution calculations system 22, a statistical analysis system 24, and a tolerance system 26. The system 20 for extracting MICR code line data can use any known means for locating the MICR code line 15 on the check image 14, and extracting the MICR characters and their coordinates from the check image 14. For example, connected component analysis, which is a well know technique for locating chunks of connected pixel data on a black white image, may be utilized.

Data from an illustrative check image 14 is shown in FIG. 2, which includes a table that shows the MICR characters 34 appearing on the check, MICR character coordinates 36 within the check, and resulting resolution values 38 for the MICR code line 15. In this case, the MICR code line data 15 is made up of 32 MICR characters as shown in the first two columns, and the MICR character coordinates 36, which comprise a top left X coordinate, a top left Y coordinate, a bottom right X coordinate, and a bottom right Y coordinate.

The horizontal distance or "pitch" between each character in the check image 14 is calculated as the difference between bottom right X coordinate of adjacent characters, i.e., the control spacing per ANSI specification. This value is determined as follows:

BottomRx(n+1)−BottomRx(n), where n is nth character in the printed sequence of characters in the MICR code line 15. The height of each character can for example be calculated as the vertical difference between the bottom right Y coordinate and the top left Y coordinate for the character, i.e., BottomRy(n)−TopLy(n).

Given the ability to determine these measurements, a set of resolution values 38 can be determined comprised of the resolution data, Diff Rx and Diff Ry, where Diff $Rx$=(Bottom$Rx$($n$+1)−Bottom$Rx$($n$))*8, which represents the distance between bottom right coordinates of successive characters multiplied by 1/0.125 (i.e., 8). Accordingly, Diff Rx represents eight times the number of calculated pixels in 0.125 inches of length, or the pixels per inch in the horizontal direction, i.e., the X direction image resolution of two successive characters.

Diff $Ry$=(Bottom$Ry$($n$)−Top$Ly$($n$))*8.55, which represents the height of a given character n multiplied by 1/0.117 (i.e., 8.55). Diff Ry represents 8.55 times the number of calculated pixels in 0.117 inches of height, or the pixels per inch in the vertical direction, i.e., the Y direction image resolution for each character.

Figure 3:
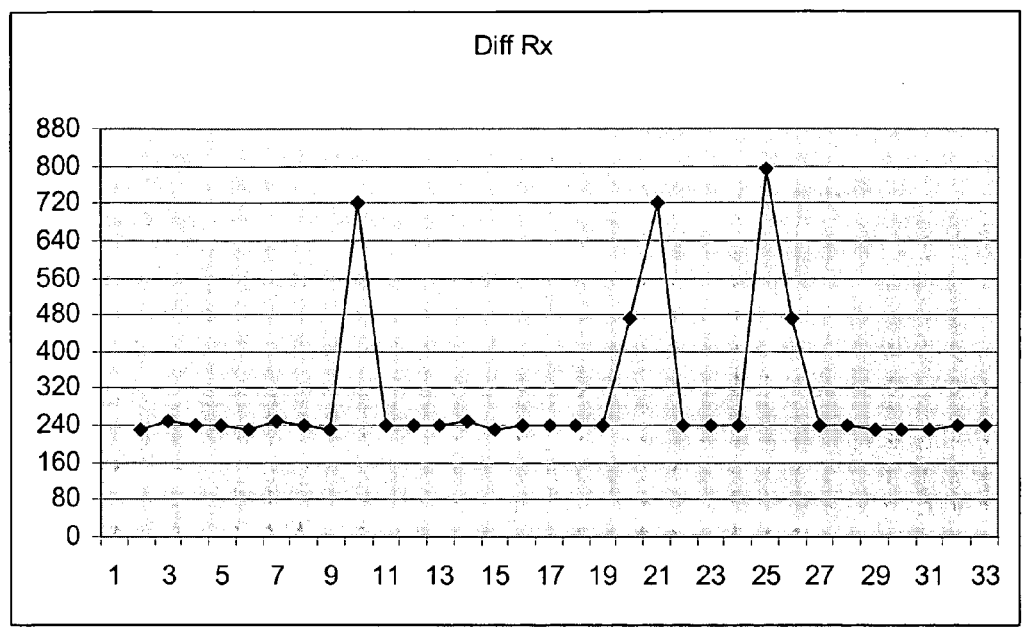
FIG. 3 depicts a graph of the X coordinate resolution values of the first image.

Once the resolution values 38 (Diff Rx and Diff Ry) are made, statistical analysis system 24 may be utilized to eliminate any bad data points and determine a representative value for both Diff Rx and Diff Ry. Because the fields of a MICR code line can be printed at different times and be spaced from each other is a non-regimented fashion, statistical anomalies may be introduced among the resolution values 38, particularly for the Diff Rx values, which relate to the horizontal pitch. For example, as shown in FIG. 3, a number of bad data points (i.e., spikes) are apparent when the Diff Rx values are plotted for each character pair. Statistical analysis system 24 is utilized to eliminate such anomalies.

One illustrative method for achieving this involves determining a median value of the resolution values 38. A median value is determined, e.g., by ordering all of the resolution values 38 in descending order and then identifying the center of the population. For the Diff Rx example shown in FIGS. 2 and 3, this would result in an ordering of (792, 720, 472, 472, 248, 248, 248, 240, 240, 240, 240, 240, 240, 240, ... 232, 232, 232, 232), with center of the population being 240. Thus, the bad data points 792, 720, 472, 472, which likely relate to the distances between printed fields in the MICR code line, have been essentially eliminated using this analysis.

Once a representative value for both the Diff Rx and Diff Ry are established, tolerance system 26 can be implemented to identify a resolution 30 by matching the representative values to known industry standard resolution operating points. As is known in the art of check imaging, there exist a number of practiced operating points used for resolution, e.g., 200 and 240 are common operating points for black white images. In the plot shown in FIG. 3, the representative value, in this case 240, is matched against the set of possible resolution operating points (+/− a tolerance, e.g., 15) to determine a matching operating point. Tolerance system 26, which sets the tolerance value, is used to accommodate for scanning inaccuracies, bitonal conversion inaccuracies, etc. In this case, assuming two possible operating points of 200 and 240, and a tolerance of +/−15, the representative value of 240 would be matched against both a first tolerance range of 185-215 (for operating point 200) and a second tolerance range of 225-255 (for operating point 240). In this example, because the representative value falls within the second tolerance range, the X direction resolution would be 240 dpi.

Figure 4:
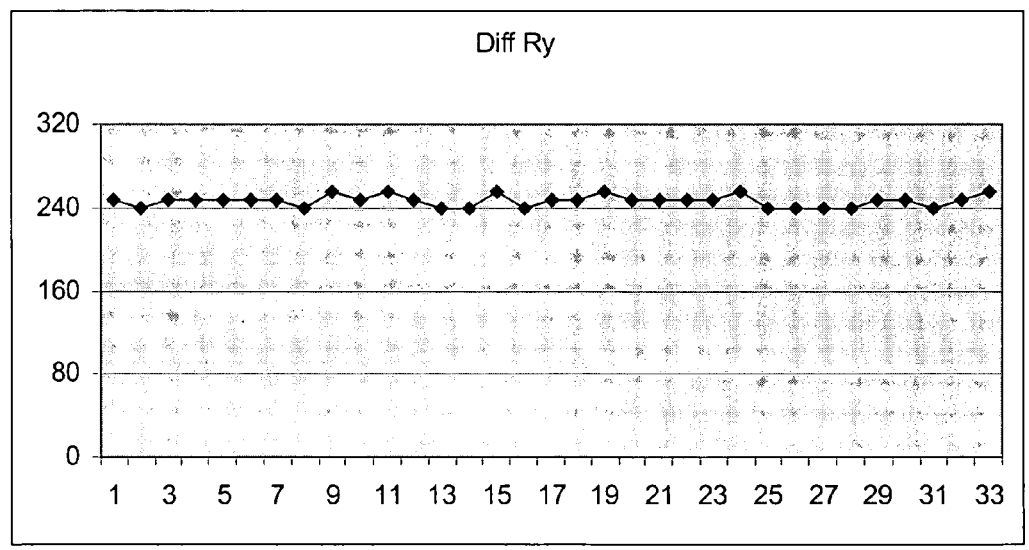
FIG. 4 depicts a graph of the Y coordinate resolution values of the first image.

Similarly, as shown in FIG. 4, Diff Ry is plotted for each character. A representative (e.g., median) value of 247.95 is determined, which would match the tolerance range of 225-255, resulting in a calculated resolution of 240. Thus, for the example shown in FIGS. 2-4, it can be deduced the resolution is 240 for both the X and Y directions. The calculated resolution values for one or both of the X and Y directions may be outputted as the final resolution 30.

Figure 6:
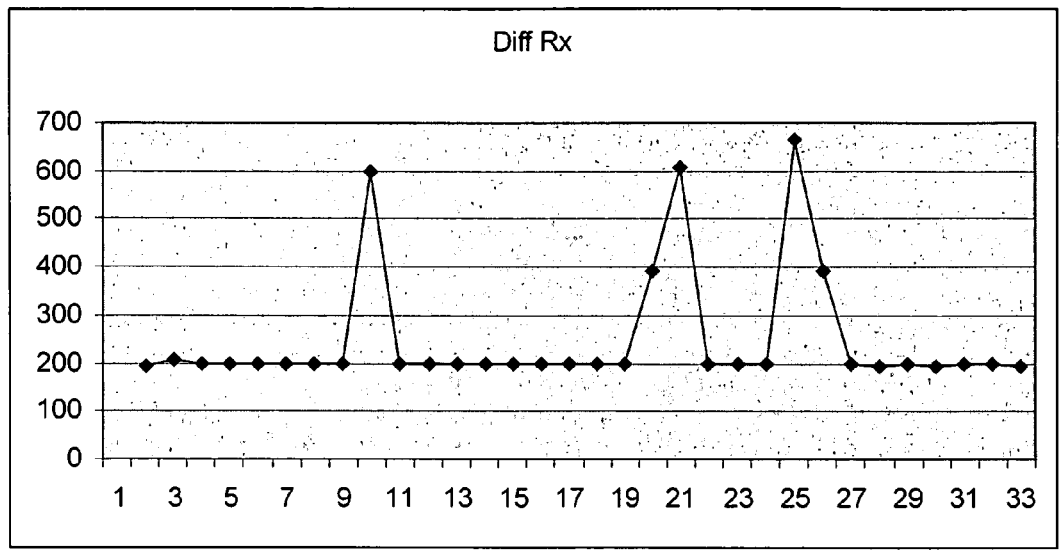
FIG. 6 depicts a graph of the X coordinate resolution values of the second image.
Figure 7:
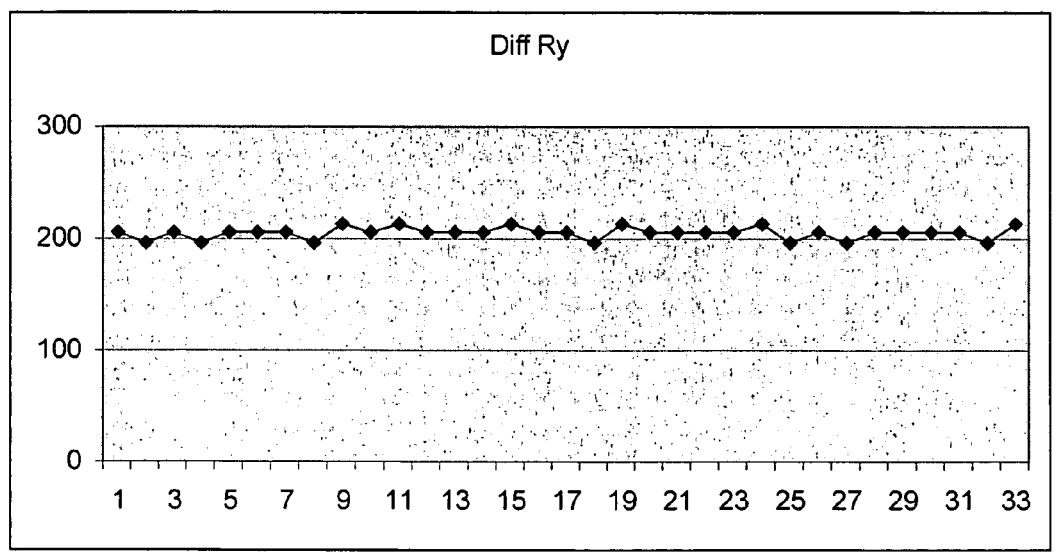
FIG. 7 depicts a graph of the Y coordinate resolution values of the second image.

FIGS. 5-7 show a second example where the representative values of Diff Rx and Diff Ry are 200 and 205.2 respectively. In this case, it can be readily deduced that the matching operating point would be 200 in both directions, thus resulting in a calculated resolution of 200 dpi.

It should also be understood that computer system 10 may comprise any type of computer, e.g., workstation, laptop, handheld device, PDA, cell phone, smart appliance, etc. The processor 17 may comprise a single processing unit, or may be distributed across one or more processing units in one or more locations. Memory 12 may comprise any known type of data storage and/or transmission media, including magnetic media, optical media, random access memory (RAM), read-only memory (ROM), etc. Moreover, similar to the processor, the memory 12 may reside at a single physical location, comprising one or more types of data storage, or be distributed across a plurality of physical systems in various forms.

I/O 16 may comprise any system for exchanging information to/from an external source. External devices/resources may comprise any known type of external device, including a scanner, a CRT, LED screen, handheld device, keyboard, mouse, voice recognition system, speech output system, printer, monitor/display, facsimile, pager, etc. A bus provides a communication link between each of the components in computer system 10, and likewise may comprise any known type of transmission link, including electrical, optical, wireless, etc. In addition, although not shown, other components, such as cache memory, communication systems, system software, etc., may be incorporated into computer system 10.

The system 18 for determining image resolution may be stored in the computer system memory 12, such that the functional components are provided as a computer program product. It should be appreciated that the teachings of the present invention can be offered as a business method on a subscription or fee basis. For example, system 18 for determining image resolution could be created, maintained, supported, and/or deployed by a service provider that offers the functions described herein for customers.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also comprise a computer-readable medium for storing a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. For example, the invention could be implemented by determining either or both the horizontal and vertical resolution. Such modifications and variations that may be apparent to a person skilled in the art are intended to be included within the scope of this invention as defined by the accompanying claims.

The invention claimed is:

1. A computerized method for determining an image resolution of a document image, comprising:
   extracting a magnetic ink code recognition (MICR) code line from the document image;
   determining coordinate values for each of a plurality of MICR characters in the MICR code line;
   calculating a set of resolution values based on the coordinate values of the MICR characters and a known spatial characteristic of a MICR character set; and
   calculating a final resolution value from the set of resolution values, wherein the final resolution value is given as a number of pixels per unit length.

2. The method of claim 1, wherein the step of extracting the MICR code line utilizes connected component analysis.

3. The method of claim 1, wherein the coordinate values include horizontal and vertical data.

4. The method of claim 1, wherein the step of calculating the set of resolution values determines a horizontal resolution value for sequential MICR characters in accordance with the equation:

$$(BottomRx(n+1) - BottomRx(n)) * 8,$$

where $BottomRx(n)$ is a bottom right horizontal direction coordinate of an nth character.

5. The method of claim 1, wherein the step of calculating the set of resolution values determines a vertical resolution value for each MICR character in accordance with the equation:

$$(BottomRy(n) - TopLy(n)) * 8.55,$$

where $BottomRy(n)$ is a bottom right vertical direction coordinate of an nth character and $TopLy(n)$ is a top left vertical direction coordinate of the nth character.

6. The method of claim 1, wherein the step of calculating a final resolution value includes the step of matching a median value from the set of resolution values with a set of known resolution operating points to determine the final resolution value.

7. The method of claim 6, wherein the step of calculating a final resolution value incorporates a tolerance value into the matching step.

* * * * *